Patented Feb. 14, 1933

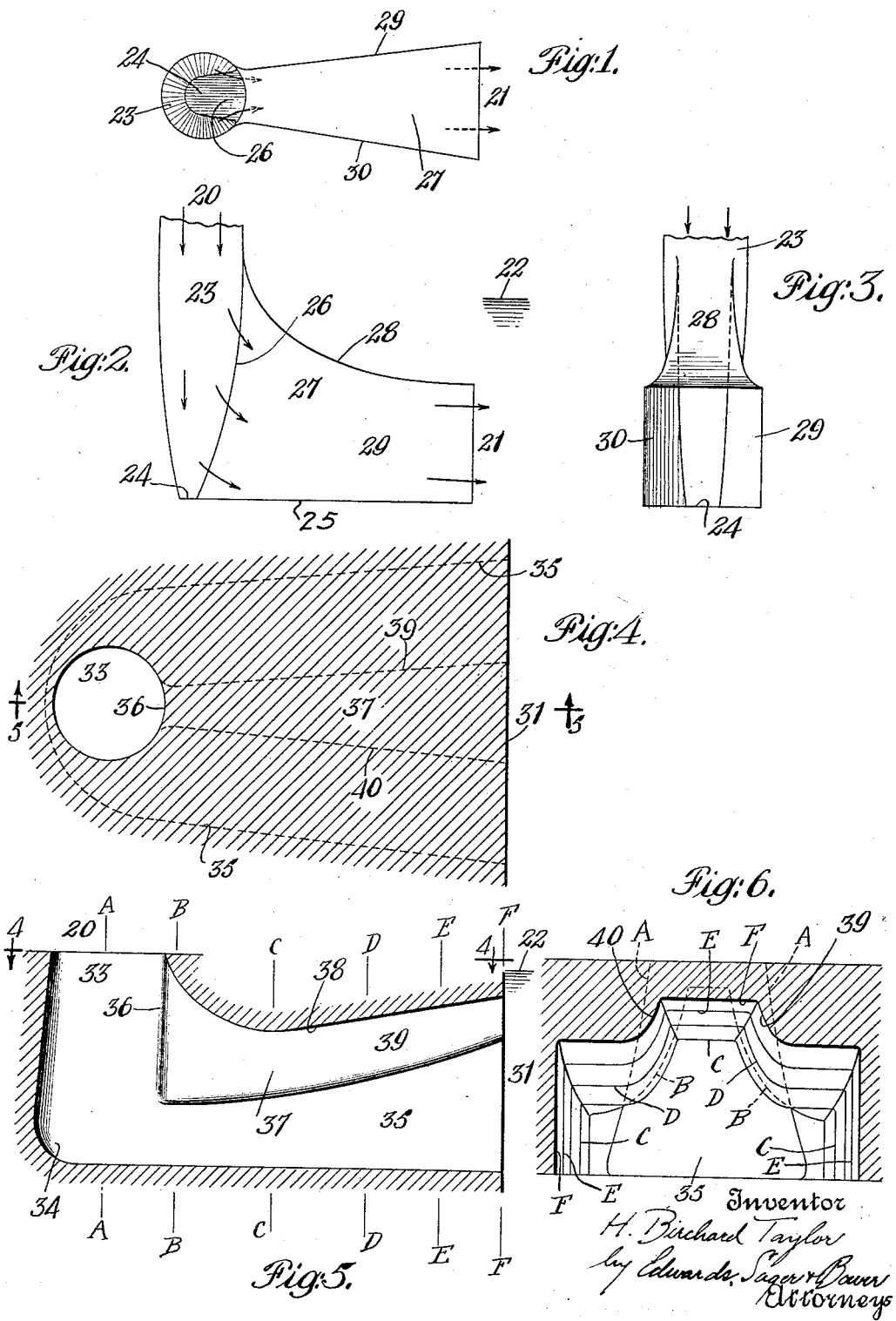

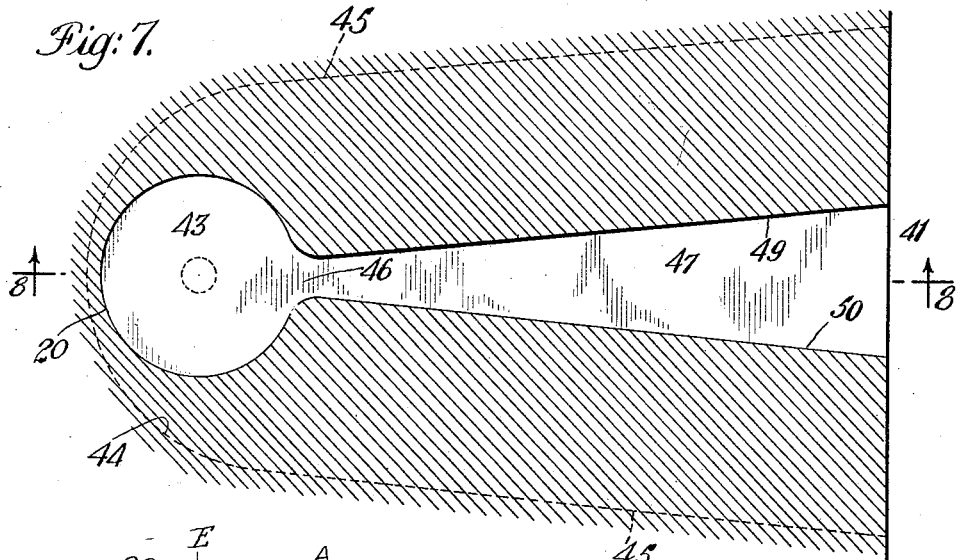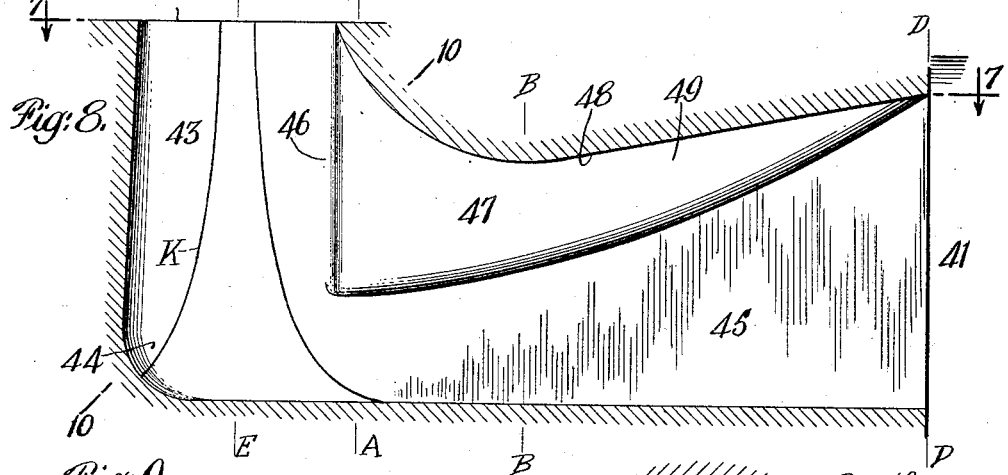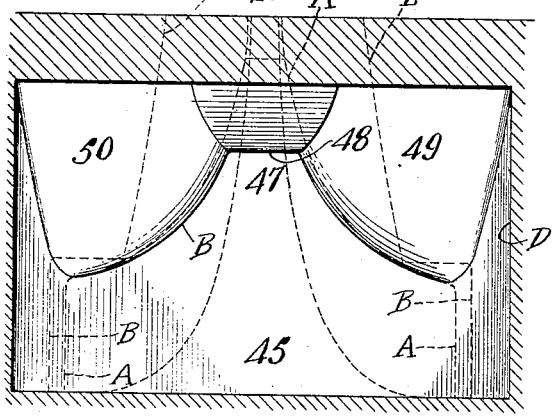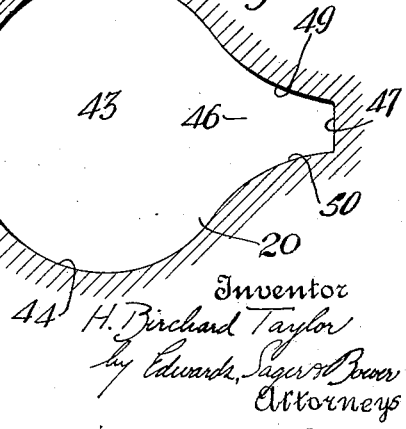

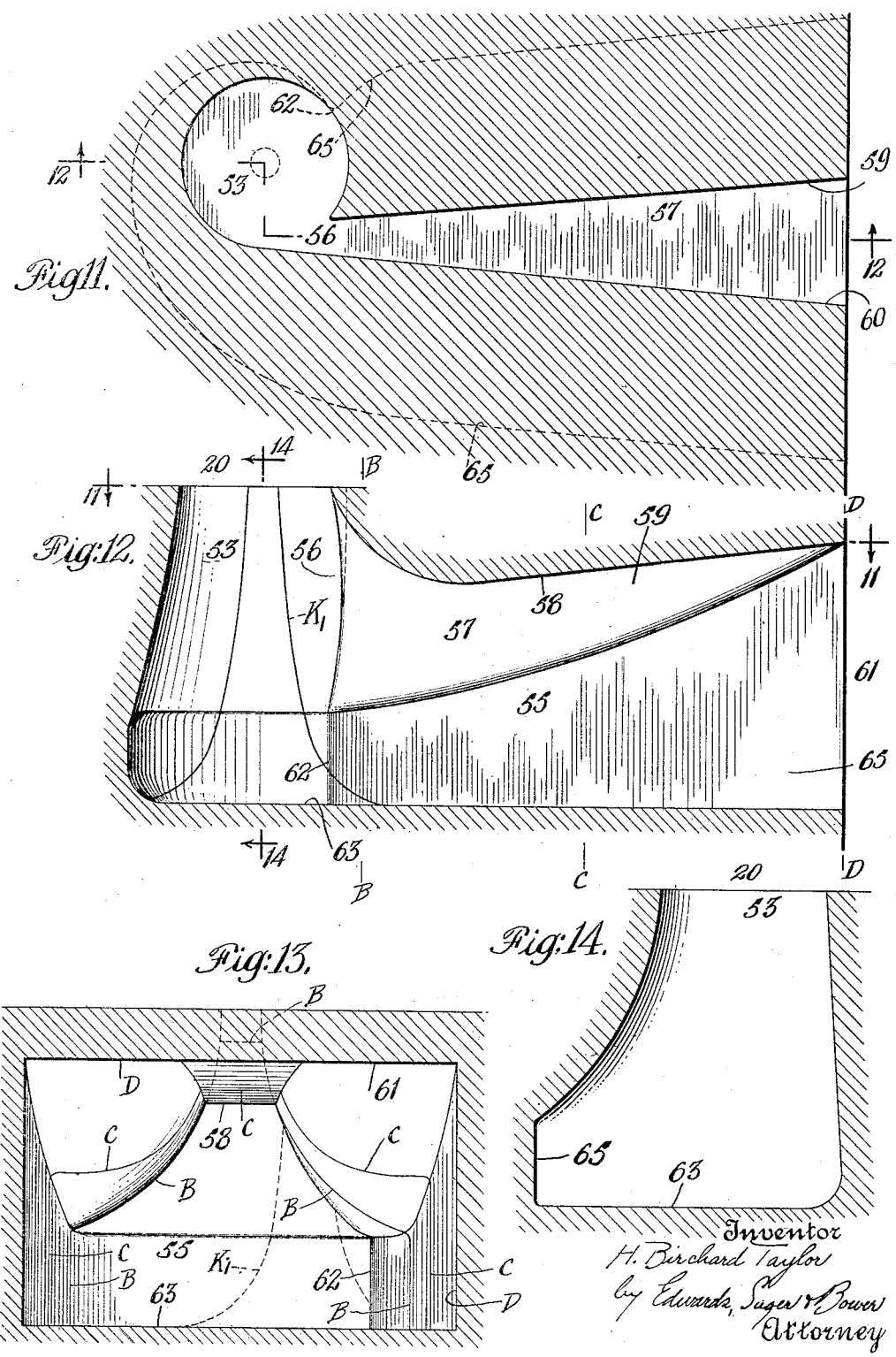

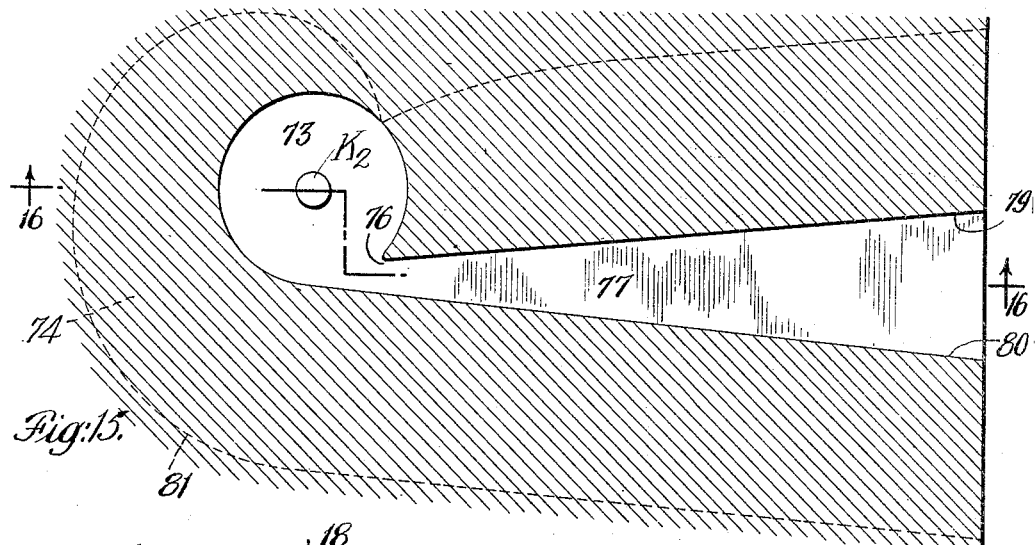
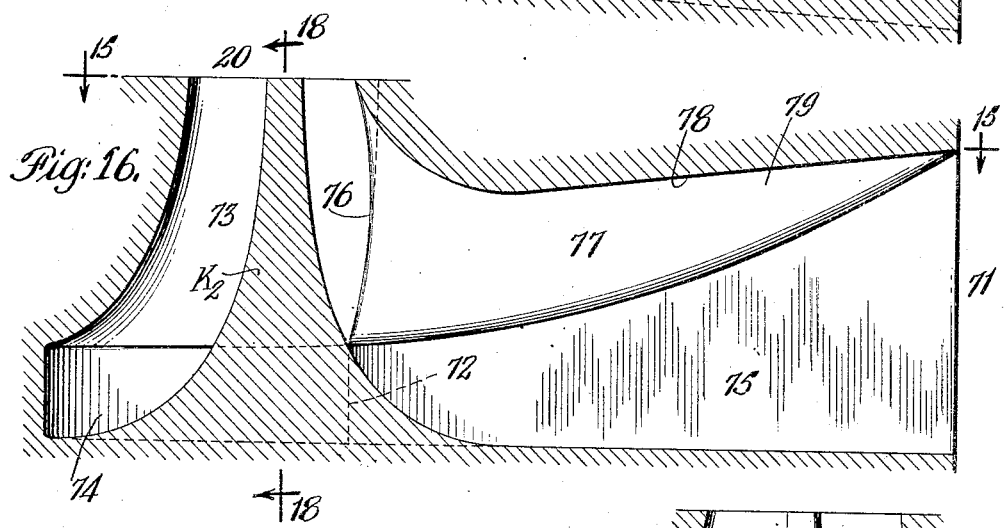
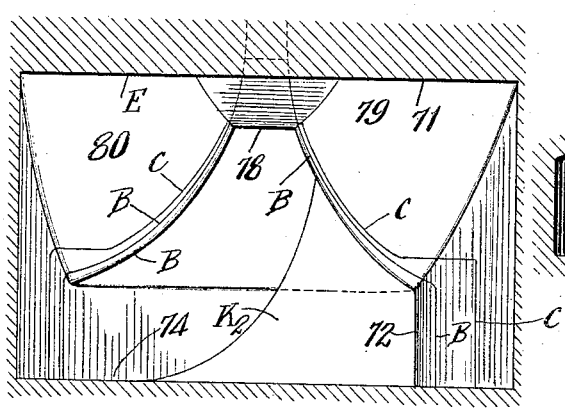
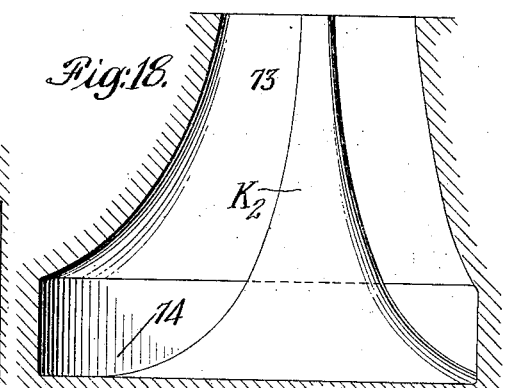

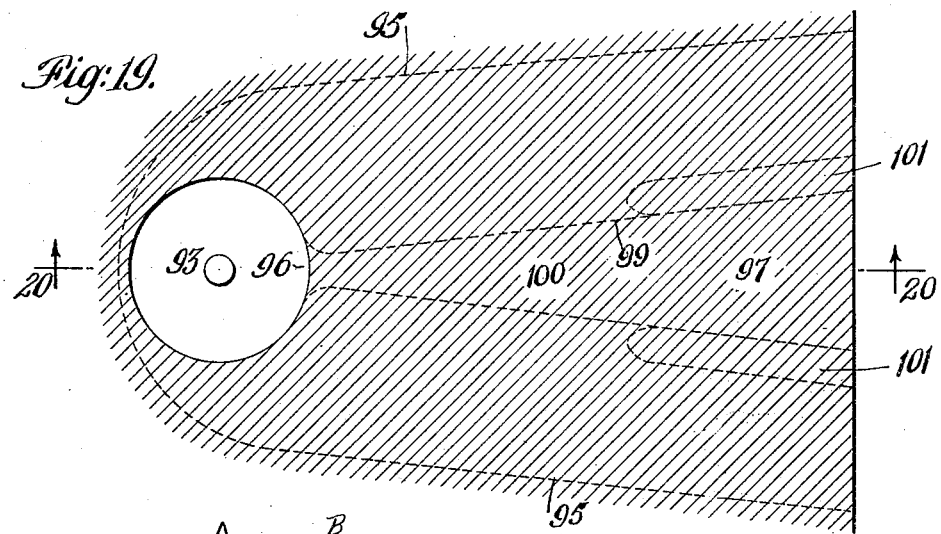
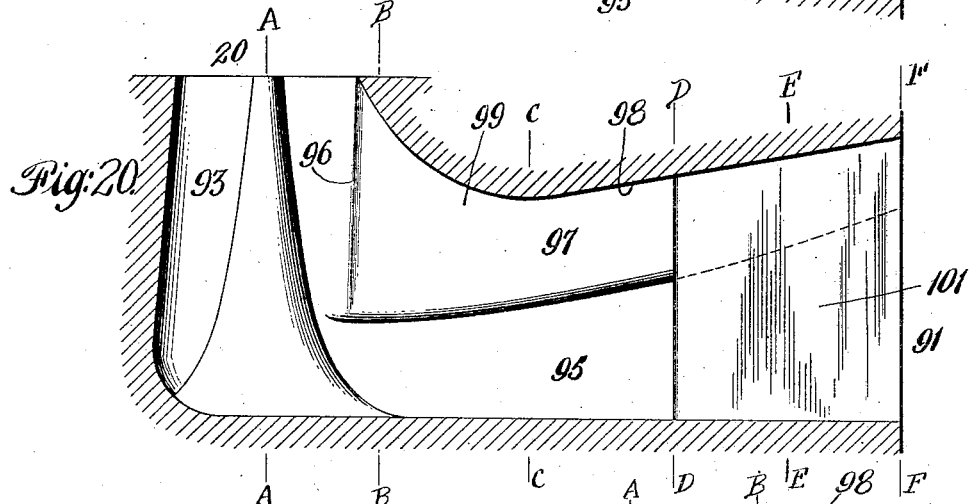
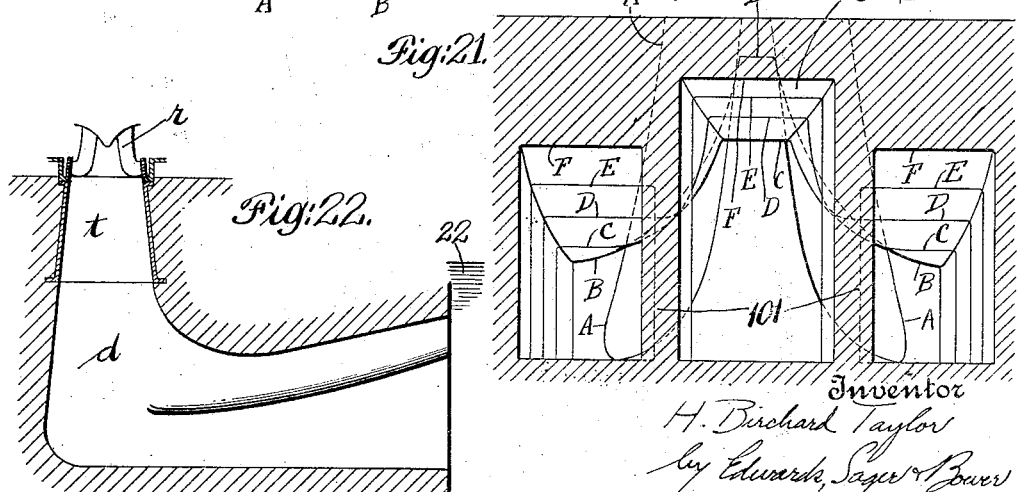

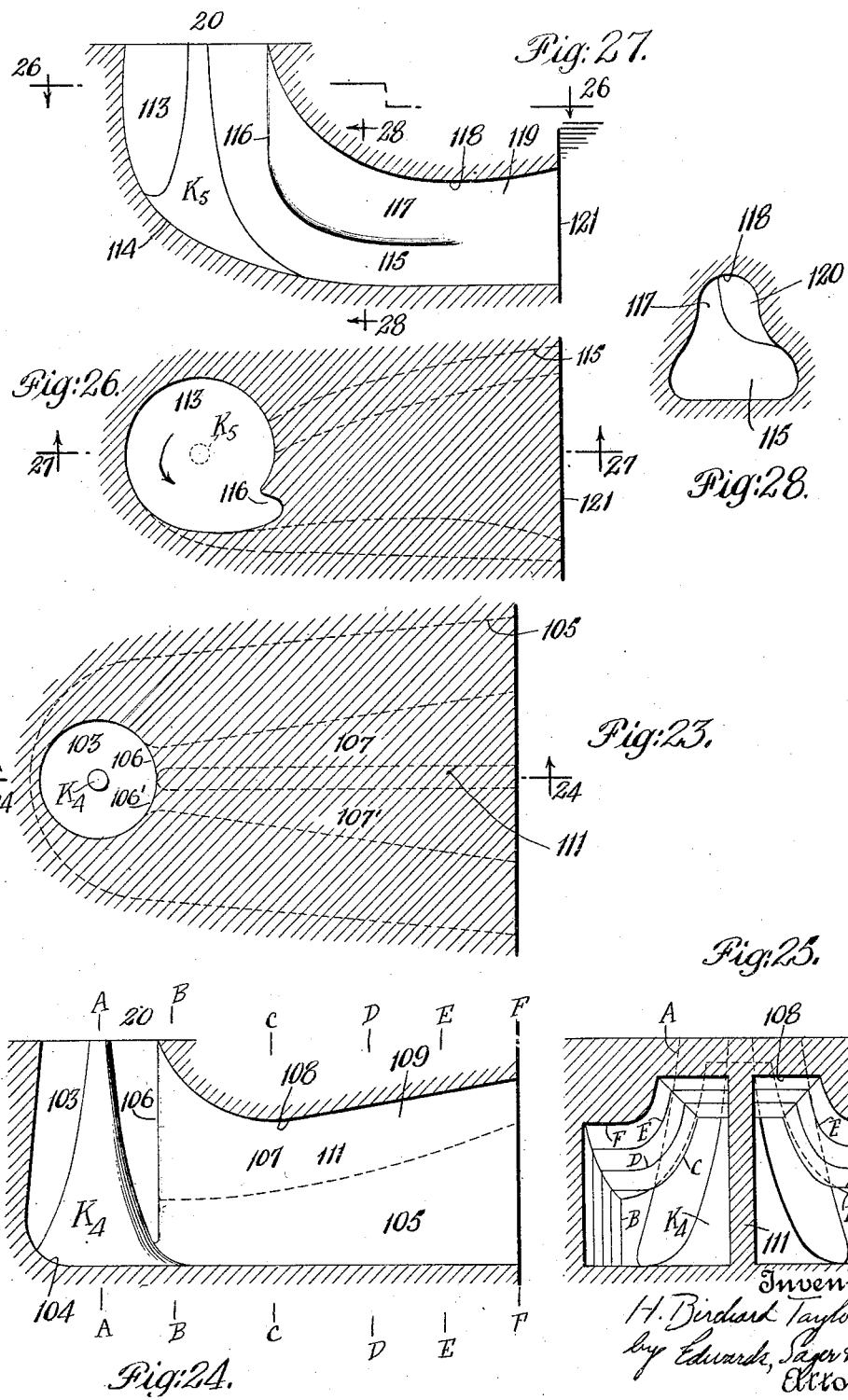

1,897,502

UNITED STATES PATENT OFFICE

HARVEY BIRCHARD TAYLOR, OF PHILADELPHIA, PENNSYLVANIA

DRAFT TUBE

Application filed November 18, 1922. Serial No. 601,821.

This invention relates to hydraulic turbine installations and particularly to an outflow conduit or draft tube for turbines and the like.

In the usual turbine installation it is necessary to turn the outflow from the turbine runner through an angle to lead the flow finally to tail water. For instance it is common practice with a vertical turbine unit to use an elbow shaped draft tube turning the outflow from vertical to horizontal and discharging horizontally into tail water. Such elbow draft tubes are often obstructive to the natural flow lines and inefficient, and these and similar types of tubes aim to turn all the flow lines practically simultaneously and to carry the whole flow through the bend or guiding surfaces turning the flow.

The object of this invention is to avoid the objections to these prior draft tubes and in particular to avoid the necessity of turning the whole outflow at a single short bend and to permit the flow to be gradually and efficiently turned and decelerated within a relatively small space. In the draft tube of this invention the outflow is diverted in whole or in part from the paths followed in prior draft tubes, the diverted portions being successively and gradually withdrawn from the initial outflow tube and turned smoothly with gradually decreasing velocity to the outlet into tail water. This diversion of the regular flow takes place along the inner portions of the bend or elbow and permits the overall dimensions of the draft tube to be reduced. For instance with a vertical unit the vertical flow is reduced in volume or entirely absorbed by the lateral diversion and the overall width of the draft tube is correspondingly reduced so as to permit successive turbine units in a power house to be relatively closely spaced.

In the accompanying drawings illustrating various aspects of the invention

Figs. 1, 2 and 3 are diagrammatic plan, side and end views respectively of a draft tube illustrating the principle of the invention.

Fig. 4 is a horizontal sectional view of a draft tube of this invention taken on line 4—4 of Fig. 5.

Fig. 5 is a vertical sectional view of the draft tube of Fig. 4 taken on line 5—5.

Fig. 6 is an end view of the draft tube of Figs. 4 and 5 looking into it from the tail water end.

Fig. 7 is a horizontal sectional view of another form of draft tube taken on the line 7—7 of Fig. 8.

Fig. 8 is a vertical sectional view on line 8—8 of Fig. 7.

Fig. 9 is an end view of the draft tube of Figs. 7 and 8 looking into the tail water end.

Fig. 10 is a sectional view taken on the line 10—10 of Fig. 8.

Fig. 11 is a horizontal sectional view of another form of draft tube taken on line 11—11 of Fig. 12.

Fig. 12 is a vertical sectional view taken on line 12—12 of Fig. 11.

Fig. 13 is an end view of the draft tube of Figs. 11 and 12 looking from the tail water end.

Fig. 14 is a vertical sectional view on line 14—14 of Fig. 12.

Fig. 15 is a horizontal sectional view of another form of draft tube taken on the line 15—15 of Fig. 16.

Fig. 16 is a vertical sectional view taken on line 16—16 of Fig. 15.

Fig. 17 is an end view of the draft tube shown in Figs. 15 and 16 and taken from the tail water end of the turbine.

Fig. 18 is a sectional view on line 18—18 of Fig. 16.

Fig. 19 is a plan view of another from of draft tube.

Fig. 20 is a vertical sectional view on line 20—20 of Fig. 19.

Fig. 21 is a diagrammatic end view illustrating by a series of sections the formation of the walls of the draft tube shown in Figs. 19 and 20.

Fig. 22 is a vertical sectional view of a modification.

Fig. 23 is a plan view of another form of draft tube.

Fig. 24 is a vertical sectional view on line 24—24 of Fig. 23.

Fig. 25 is a diagrammatic end view of the draft tube of Figs. 23 and 24 showing the formation of the draft tube walls by a series of typical vertical sections.

Fig. 26 is a horizontal sectional view of another form of draft tube taken on line 26—26 of Fig. 27.

Fig. 27 is a vertical sectional view on line 27—27 of Fig. 26, and

Fig 28 is a vertical sectional view taken on line 28—28 of Fig. 26.

In Figs. 1 to 3 one specific and relatively simple form of the invention is illustrated in outline in connection with a draft tube for a vertical turbine. The flow enters the draft tube vertically downward at 20 and is turned and delivered horizontally at 21 into tail water 22. The vertical portion of the draft tube comprises the tube 23 having inwardly contracting walls and terminating at its lower end at 24. The downstream side of the tube 23 has an opening 26 for a discharge passage 27 receiving the flow from the tube 23 through this opening or slot 26 at one end and discharging into tailwater at 21. The top surface 28 of the diffuser passage 27 curves gradually from the vertical at the tube 23 to the horizontal at the discharge end 21 and the bottom 25 of the diffuser passage extends horizontally from the lower end of the slot 26, the side walls 29 and 30 of this diffuser passage diverging in the direction of flow from the tube 23 to the outlet 21 so as to gradually decelerate the flow and convert its velocity head into pressure head at the tailwater outlet. The effect of this diversion of the water from the vertical path in the tube 23 is to reduce the quantity of water in the tube 23 and correspondingly reduce its velocity. This is a new method of decelerating the flow in the primary or regular tube. Instead of enlarging its area, successive portions of the flow are diverted through the opening or slot 26 into the lateral diffuser passage 27 and in the particular example shown in Figs. 1 to 3 the entire flow of the draft tube 23 is absorbed by this diversion into the lateral diffuser passage 27. The successive areas of the tube 23 in the direction of flow are of such size as to just permit a gradual and efficient deceleration of the flow in the tube by the diversion of successive portions of the flow through the lateral diffuser. This lateral diffuser 27 extends at an angle to the primary tube 23, and thus forms an angular member carrying the flow in generally horizontal direction downstream. The diverging primary member decreases in length towards its discharge extremity in the downstream direction of the angular member, so that its outlet extremity is formed with an upward terminal slope, as shown in Fig. 2 although the other figures also inherently have such an upwardly inclined terminal or slope at the outer extremity of the primal tube, e. g. $(t, d)$, Fig. 22, for example.

The flow in passing from the entrance 20 to the discharge 21 is thus continuously decelerated and gradually turned into the horizontal direction without abrupt changes in direction or the formation of wasteful eddies or disturbances. The lateral diversion and diffusion takes place throughout any desired portion of the length of the regular tube 23 and the general form of the resulting draft tube is relatively short and narrow, most efficiently utilizing the space in the subfoundation on the tailwater side of the turbine unit.

Instead of diverting the whole of the flow of the tube 23 so as to absorb it entirely in the diffusion passage 27 extending all the way to the bottom of the tube only a part of the flow may be diverted and the remainder will then be collected at the bottom of the primary tube as illustrated for instance in Figs. 4 to 6. The flow enters this draft tube vertically downward at 20 and is turned and delivered horizontally at 31 into tail water 22. The vertical portion of the draft tube 33 has slightly flaring walls and terminates at its lower end in a bottom portion 34 of relatively short curvature in which the flow from the tube 33 is turned and passed horizontally to the outlet passage 35 forming a part of the draft tube as a whole. The downstream side of the tube 33 has an opening 36 for the diffuser passage 37 receiving the diverted flow from the tube 33 through this opening 36 at one end and merging with the horizontal portion 35 of the draft tube. The diffuser passage 37 thus terminates above the bottom of the tube 33 and is in effect interposed across the inner angle of the draft tube bend or elbow formed by the passages 33, 34 and 35. The upper or inner surface 38 of the diffuser passage 37 curves gradually to the horizontal and then flares slightly upward to the discharge into tailwater at 31 and the side walls 39 and 40 of the diffuser passage diverge in the direction of flow so as to gradually decelerate the flow and convert its velocity head into pressure head at the tailwater outlet. The effect of this diversion of water from the regular vertical path in the tube 33 is, as in the tube 23, to reduce the quantity of water in the tube and correspondingly reduce its velocity. The flow in the tube 33 thus has its velocity reduced by the diversion and also in some cases by expansion of its area in the direction of flow and this latter reduction of velocity converts velocity head at the upper end 20 into pressure head at the lower end 34 where the flow from the vertical tube 23 is turned into the horizontal direction. In the horizontal passage 35 of the draft tube the deceleration of the flow is continued by progressively enlarging the area of said passage, the combined cross sectional areas of said passage 35 and the diffuser passage 37 are thus progressively increased in the direction of flow to effect a simultaneous deceleration of both flows all the way to tailwater.

The effect of this diversion and diffusion of the regular flow is a decrease of the regular flow so that for instance the size of the tube 23, 33 is reduced. The diffusion passage 27, 37 is added to the upper or inner side of the draft tube so as not to increase its overall height. The hitherto unused space at the inside of the bend or elbow is thus utilized to attain a smooth turning and deceleration of the flow while reducing the overall dimensions of the draft tube. Or within the same overall dimensions there is attained a larger deceleration of the flow with correspondingly increased recovery of energy from the runner discharge.

The design of tubes outlined in Figs. 1 to 6 are intended for use with a runner in which there is but little discharge whirl, the lateral diffuser passage 27, 37 being positioned centrally on the downstream side of the tube. In Fig. 6 the form of the draft tube is shown diagrammatically by superposing in the end view successive typical sections on the lines A, B, C, D, E and F of Fig. 5. Starting at the upper end of the tube at 20, the water which is deflected at this point into the lateral diffuser passage 27, 37 will be at very nearly the full velocity with which it enters the tube. It is therefore necessary to decelerate this velocity in the lateral diffuser within the available length of passage between the wall of the draft tube 23, 33 and the downstream wall of the power house. If the side opening 26 extended all the way across the draft tube, that is, if it had an entrance width equal to the diameter of the draft tube, it would be impossible to decelerate this high velocity in the short distance available with a high degree of efficiency, because the angle of flare which can be efficiently employed for the side walls of the passage is limited. In the form of the draft tube shown in Figs. 1 to 6 for instance this flare will be in the neighborhood of 10° to 15°. If it were attempted to provide a lateral diffuser passage having a width equal to the draft tube diameter at the top and with walls flaring at 10 to 15° the opening which would be obtained at 21, 31 at the downstream wall of the power house would not be sufficient to reduce the initial velocity by more than a comparatively small amount. In other words, such a diffuser would be too short and wide to decelerate the water sufficiently and it would be necessary to discharge it into the tail water with a very high velocity head still remaining in it.

If, however, the opening 26 at the draft tube wall is made narrower and if the side walls, 29, 30, 39, 40 flare at the permissible angle of 10° to 15° then by the time the power house wall is reached the relative width of the passage will have been very greatly increased. It is therefore a simple geometrical problem to determine the proper width of slot 26, 36 at the draft tube wall which will give a sufficient deceleration of the initial velocity head within the available length of the passage 27, 37 between the draft tube 23, 33 and the power house wall.

As the regular flow progresses downward through the draft tube 23, 33 the deceleration of the water within this draft tube progressively lowers the velocity of the diverted flow into the diffuser passage 27, 37. It therefore becomes possible in the lower parts of the lateral diffusion passage 37 as shown in Figs. 4 to 6 to employ a progressively wider opening of the slot 36 and by maintaining the diverging relation of the side walls 29, 30, 39, 40 of the diffuser passage. The lower portion of the diffusion passage widens out further and further as it merges with the discharge passage 35 of the draft tube. The final shape of the outlet opening into tailwater at 31 is shown by the outline F in Fig. 6. The entire design therefore becomes rational and subject to definite calculation. In the draft tube of Figs. 3 to 6 the horizontal portion of the tube comprising the outlet passage 35 and the diffuser passage 37 merging with it will thus continue the gradual deceleration of the flow received from the vertical draft tube 38 and in the tube of this invention the lateral widening or flaring of the horizontal passages is not excessive so as to take up a wide space but may readily be kept for instance within an angle of 20° where desired so as to reduce the space required for draft tube and permit a relatively close spacing of successive turbine units.

The draft tube of Figs. 7 to 10 is similar in general form to that of Figs. 4 to 6, the flow being received at 20 and turned and discharged horizontally at the outlet 41. Between the vertical portion 43 of the draft tube and the horizontal portion 45 is the relative sharp bend or turn 44 and an opening 46 on the downstream side of the vertical portion diverts the flow into the diffuser passage 47 having a top surface 48 and side surfaces 49, 50. In this embodiment of the invention the upper surface 48 and side surfaces 49, 50 merge into the rectangular formation of the outlet opening 41 and do not form a separate upward extension thereof as shown in the form of draft tube of Figs. 4 to 6. A central core or cone K is also shown interposed at the center of the vertical tube 43 and forming this tube into generally annular form and particularly adapting this tube for flow having a moderate whirl. In Fig. 10 a typical cross section of the draft tube is shown taken at about 45° through the bend or elbow. This section graphically shows the form of tube as comprising a main or vertical portion of generally rounded form 43 from which extends a diffuser passage 47 on the inside of the bend, the diffuser passage being narrower than the regular tubular portion and the core K being used or omitted as desired. Various changes in the size and proportions and shapes of these parts may be resorted to depending upon the requirements of specific installations.

In the draft tube of Figs. 11 to 14 the passages are modified to suit a whirling discharge from the runner. The modification consists in moving the lateral diffuser 57 and its entrance opening or slot 56 off the center line so as to give the vertical tube 53 an eccentric or volute formation. Starting at the top 20 of the tube 53 the draft tube is circular but as it progresses downward this draft tube 53 takes up more and more of the volute or spiral form, the width of the opening or slot 56 correspondingly increasing as shown. From this slot the side walls 59 and 60 of the diffuser passage 57 diverge to decelerate the flow and these side walls and the top wall 58 finally merge into the rectangular outlet opening 61 at tail water. The discharge or outlet passage 55 begins at one side at the baffle 62, the other side of said baffle beginning the development of the lowermost spiral surface 63 of the tube 53 which surface expands as it continues around to merge with the other wall 65 of the discharge passage 55. The centers of the discharge passage 55 and diffuser passage 57 are in substantially the same vertical plane and eccentric to the center of the draft tube 53. A central core or cone $K_1$ forms the whirling flow into generally annular form and this whirling flow as it passes down through the annular tube 53 is diverted tangentially through the slot or opening 56 into the diffusion passage 57. The final undiverted flow is collected along the bottom spiral 63 and passed into the outlet passage 55. The flow is continuously and gradually decelerated in the tube 53 and the passages 57 and 55 and is also smoothly turned along natural whirling lines toward the tailwater.

In Figs. 15 to 18 a modified form of draft tube is shown particularly adapted for whirling flow and in which the annular fluid passage of the tube 73 flares outward to a considerable extent at the bottom 74 around the broadened base 72 of the central cone or core $K_2$ as indicated by sections designated B, C in Fig. 17. The whirling vertical flow is thus carried down on expanding lines while successive portions of it are diverted through the opening 76 into the diffuser passage 77 formed by walls 78, 79, 80. The spread portions of the flow at the bottom 74 of the tube 73 are collected and guided by the volute surface 81 and passed on to the discharge outlet 75 adapted to continue the deceleration of the flow lines commenced in the tube 73. The spreading of the fluid passages as shown in Figs. 15 to 18 while it may be highly desirable in installations where there is a large amount of whirl of the discharge from the runner, requires a wider space for the draft tube setting due to the wider sweep required for the volute 81. The divergence of the draft tube walls and the rate of expansion of the conduit areas in the direction of flow are still kept within moderate limits of 20° or less so that there is but little widening of the discharge outlet 75 as it progresses toward tailwater 71 and the overall dimensions of the draft tube setting are still kept within compact limits.

In the draft tube shown in Figs. 19 to 21 the flow entering at 20 is turned and decelerated and discharged at 91 the flow being received in the annular passage of draft tube 93 with part of it diverted through the diffuser passage 97 having entrance opening 96 and walls 98, 99 and 100. The remainder of the flow is collected and passed out through the discharge outlet 95, successive vertical sections being indicated on the lines A, B, C, D, E and F of the figures. At the tailwater end of the diffuser passage 97 and outlet 95 the piers 101 are provided extending upward from the bottom of the outlet passage 95 and supporting the concrete structure above. These piers 101 are formed as stay vanes conforming to the lines of flow in the diffuser passage and outlet and they separate the tail water opening into three windows. These stays or piers add greatly to the strength of the sub-foundation without impairing the hydraulic operations of the draft tube in turning and decelerating the flow efficiently.

In installing the draft tube of this invention it is not required that the runner shall be in any definite proximity to the turning and decelerating passages. The runner may be installed directly at the entrance 20 to the draft tube or as will often be preferable an intermediate conduit such as the straight draft tube $t$ may be interposed between the runner $r$ and the draft tube $d$ of this invention as shown in Fig. 22. This draft tube $d$ may be in draft tube form in accordance with the principle of this invention and in the outline shown in Fig. 22 the draft tube $d$ is substantially similar to the draft tube of Figs. 4, 5 and 6. The effect of interposing the straight draft tube $t$ of increasing cross sectional area is to decelerate the flow between the runner $r$ and the entrance to the draft tube $d$ so that the flow will enter the draft tube $d$ at less velocity than if the runner were interposed directly at the entrance of this draft tube $d$. In all respects the operation and effect of the draft tube $d$ in this combination is similar to that explained above and the deceleration begun in the straight section $t$ is continued in the draft tube $d$ simultaneously with the turning of the flow and the passing of it to tail water.

In the modified form of draft tube shown in Figs. 23 to 25 the flow entering through the annular passage of the tube 103 around core $K_4$ is partly diverted through the openings 106, 106' into the twin diffuser passages 107, 107' within walls 109 on opposite sides of the central pier 111 extending from the bottom of the discharge outlet 105 and supporting the top wall 108 of the diffuser passages therefrom. By thus providing two diffuser passages the rate of diffusion or deceleration is doubled as the walls of each diffusion passage may have the full allowable divergence of 10° to 15°. At the same time the central pier 111 extending throughout the full length of the horizontal portion of the draft tube gives extended support from the foundation to the structure above. Successive sections of these conduits on opposite sides of the piers 111 are shown graphically by the series of sectional lines A, B, C, D, E and F of Fig. 25 and the curving of the draft tube wall into the floor of the discharge outlet 105 is shown at 104 (Fig. 24).

In the modified form of draft tube shown in Figs. 26 to 28 the lower end of the tube portion 113 instead of being carried down to a substantially flat plane at the bottom is curved off on rounded lines as indicated at 114 and thus finally and smoothly turns to the horizontal direction at the discharge passage 115 leading to tailwater 121. The diffuser passage 117 within walls 118, 119 and 120, and its entrance slot 116 are placed eccentrically to one side of the downstream center of the tube 113 so as better to receive the flow whirling in the direction of the arrow shown. A central conical core $K_5$ may also be provided extending up from the inclined bottom 114 of the tube 113. In this type of draft tube the entering flow lines will be turned sooner toward the tail water and none of the flow lines will have to pass all the way to the bottom surface of the vertical draft tube before being directed toward tail water. The inclination of the outer wall 114 of the elbow bend will also serve to guide the flow over toward the lateral diffuser 117 to make up for the flow lost by diversion in this diffuser passage. This draft tube will receive and turn and decelerate a whirling outflow without any abrupt changes in direction or velocity and within a very small space in the sub-foundation. A typical cross sectional view of the draft tube of Figs. 26 and 27 is shown in Fig. 28, this cross section being triangular in outline but it is obvious that the form of this and other cross sections may be varied widely without departing from the spirit or advantages of my invention.

In the draft tube or diffuser of this invention the flow instead of being carried downward and then turned toward tail water has the turning or diversion of the flow distributed over a desired length of the vertical portion of the tube and this diverted flow is continuously decelerated on its way to tail water. The diversion of the flow may be continued until all of the flow in the vertical portion of the draft tube is absorbed (Figs. 1 to 3) or the undiverted flow at the bottom of the draft tube may be collected and turned into the discharge outlet below the diffuser passage. In either case the hitherto unused space at the inside of the bend or elbow is utilized to turn and decelerate the flow and the resultant reduction in the regular flow reduces the sizes of the passages required to efficiently handle the flow. In this way the overall dimensions of the draft tube are reduced without sacrifice of efficiency.

The draft tube structure is simple and capable of easy formation in the usual concrete substructure and desired supporting strength may be given to it by the interposition of piers. While the invention has been illustrated in connection with the more usual vertical type of turbine unit, it is not confined thereto but may obviously be installed in connection with horizontal units or wherever there is an angle through which the flow may be turned. The draft tube or diffuser of this invention is also applicable to pumps and similar hydraulic machines wherever the flow is to be turned and decelerated with greatest efficiency.

I claim:—

1. In apparatus for converting velocity head into pressure head, the combination of a primary conduit receiving said flow, of a secondary conduit diverting successive portions of the flow from said primary conduit so as to gradually and continuously reduce the quantity of the main flow and decelerating the velocity thereof.

2. In apparatus for converting velocity head into pressure head, the combination of a primary conduit receiving said flow, of a secondary conduit diverting successive portions of the flow from said primary conduit so as to gradually and continuously reduce the quantity of the main flow and decelerating the velocity thereof, said secondary conduit being formed to gradually reduce the velocity of the diverted successive portions of flow.

3. In apparatus for converting velocity head into pressure head, the combination of a primary conduit receiving said flow, of a secondary conduit diverting successive portions of the flow from said primary conduit so as to gradually and continuously reduce the quantity of the main flow and decelerating the velocity thereof, and means for collecting the main flow left after said diverting action and further decelerating it by expanding it in the direction of flow.

4. In apparatus for converting velocity head into pressure head, the combination of a primary conduit receiving said flow, of a secondary conduit diverting successive portions of the flow from said primary conduit so as to gradually and continuously reduce the quantity of the main flow and decelerating the velocity thereof, said secondary conduit being formed to gradually reduce the velocity of the diverged flow, and means for collecting the main flow left after said diverting action and further decelerating it by expanding it in the direction of flow.

5. A draft tube having a tube portion receiving the flow and comprising an opening extending lengthwise of the tube and having an initial width less than the entrance of said tube and adapted to divert successive portions of the flow from said tube so as to lower the velocity of the flow therein.

6. A draft tube having a tube portion receiving the flow and a passage leading from the side of said tube portion and adapted to divert the flow from said tube portion so as to cause a gradual deceleration of the flow in said tube portion.

7. A draft tube having a tube portion receiving the flow and a passage leading from the side of said tube portion and adapted to divert the flow from said tube portion so as to cause a gradual deceleration of the flow in said tube portion, said passage being formed to gradually reduce the velocity of said diverted flow.

8. Means for converting the velocity head of fluid flow into pressure head comprising a straight conduit provided with a lateral opening in its wall extending lengthwise of said conduit, through which successive portions of the flow are gradually diverted, the width of the lateral opening being so related to the area of the conduit that the velocity of flow in the conduit is gradually decelerated; and a gradually enlarging passage extending laterally of the conduit and receiving the flow from said opening.

9. A diffuser or draft tube comprising a primary conduit having an opening in its side wall of increasing width in the direction of flow, said opening communicating with a gradually enlarging passage extending laterally from the primary conduit.

10. A diffuser or draft tube comprising a primary conduit having an opening in its side wall of increasing width in the direction of flow, said opening communicating with a gradually enlarging passage extending laterally from the primary conduit, the walls of said passage diverging from each other at angles not exceeding 20°.

11. A diffuser or draft tube comprising a primary conduit having an opening in its side wall, said opening communicating with a gradually enlarging passage extending laterally from the primary conduit, said opening being relatively narrow at points where the velocity in said primary conduit is high and wide where said velocity is low.

12. A diffuser or draft tube comprising a primary conduit having an opening in its side wall of increasing width in the direction of flow, said opening communicating with a gradually enlarging passage extending laterally from the primary conduit, said opening being relatively narrow at points where the velocity in said primary conduit is high and wide where said velocity is low.

13. A hydraulic conduit for turning the entering flow through substantially a right angle in which the surface of the conduit nearest the center of curvature of the turn is given a more gradual curvature in its portion lying in and near the central plane of the turn than at other portions, and in which the breadth of the conduit in the central plane measured normally to the lines of flow is greater than the breadth in planes spaced away from said central plane.

14. In a hydraulic draft tube the combination with a tube portion receiving the flow and inner guiding means turning and decelerating one portion of the flow through an angle and outer guiding means turning and decelerating the remainder of the flow around the outside of the bend formed by the inner guiding means.

15. In a hydraulic draft tube the combination with a tube portion receiving the flow and inner guiding means turning and decelerating one portion of the flow through an angle and outer guiding means turning and decelerating the remainder of the flow around the outside of the bend formed by the inner guiding means, and means for merging said portions of said flows together.

16. In a hydraulic draft tube the combination with a draft conduit adapted to turn the flow through an angle and decelerate it, of guiding means at the inner portion of said bend adapted to divert and decelerate successive portions of the flow from said conduit.

17. In a hydraulic draft tube the combination with a draft conduit of elbow form adapted to turn the flow through an angle and decelerate it, of guiding means at the inner portion of said bend adapted to divert and decelerate successive portions of the flow from said conduit.

18. A draft tube comprising an axial tube portion and a discharge portion at substantially right angles thereto, and a diffusion passage tangentially leading from said axial portion and successively diverting portions of the flow along the same into said right angle portion.

19. A draft tube comprising a tube portion, and a diffusion passage tangentially leading therefrom and successively diverting portions of the flow along said tube portion so as to decelerate the velocity of flow therein.

20. A draft tube comprising a tube having inlet and outlet passages, and a diffusion passage leading from said inlet passage along non-radial lines and adapted to divert successive portions of the flow along the side of said inlet passage into said outlet.

21. A draft tube comprising a tube portion, and a diffusion passage leading from said tube along non-radial lines and adapted to divert successive portions of the flow along said tube portion so as to decelerate the velocity of flow therein.

22. A draft tube comprising a vertical tubular portion of generally rounded section, and a horizontal portion extending therefrom having a substantially flat bottom surface and with its sections adjacent said tubular portion of greater height than width.

23. A draft tube comprising a vertical tubular portion of generally rounded section, and a horizontal portion extending therefrom having a substantially flat bottom surface and with its sections adjacent said tubular portion of greater height than width and its sections spaced from said tubular portion of greater width than height.

24. A draft tube comprising a vertical tubular portion of generally rounded section, a horizontally extending discharge outlet receiving the flow from the bottom of said tubular portion, and a lateral diffuser passage opening from the side of said tubular portion and adapted to decelerate the flow while passing it to tailwater.

25. A draft tube comprising a vertical tubular portion of generally rounded section, a horizontally extending discharge outlet receiving the flow from the bottom of said tubular portion, and a lateral diffuser passage opening from the side of said tubular portion and merging with said discharge outlet.

26. A draft tube comprising a vertical tubular portion of generally rounded section, a horizontally extending discharge outlet receiving the flow from the bottom of said tubular portion, and a lateral diffuser passage opening from the side of said tubular portion and merging with said discharge outlet, said discharge outlet and diffuser passage being offset to the same side of said tubular portion to accommodate whirling flow lines.

27. A diffuser or draft tube comprising a primary conduit having an opening in its side wall between its entrance end and its outlet end of less width than said primary conduit, said opening communicating with a gradually enlarging passage extending laterally from the primary conduit.

28. A diffuser or draft tube comprising a primary conduit having an opening in its side wall between its entrance end and its outlet end of less width than said primary conduit, said opening communicating with a gradually enlarging passage extending laterally from the primary conduit, the walls of said passage diverging from each other at angles not exceeding 20°.

29. A hydraulic conduit for turning the entering flow through an angle comprising outer surfaces connected by a curve of relatively short radius, an inner surface of relatively large radius of curvature, and side surfaces joining said surfaces, the width of any section of said conduit measured at right angles to the plane of the turn being not greater than the breadth of such section measured in or parallel to the plane of the turn.

30. A hydraulic conduit for turning the entering flow through a right angle comprising outer surfaces connected by a curve of relatively short radius, an inner surface of relatively large radius of curvature, and side surfaces joining said surfaces, the width of any section of said conduit measured at right angles to the plane of the turn being not greater than the breadth of such section measured in or parallel to the plane of the turn.

31. A draft tube comprising a straight tube portion having an annular passage directed substantially axially at is outlet end, and a diffuser passage opening from the side of said annular passage above its outlet end and adapted to divert portions of the flow therefrom.

32. A draft tube comprising a straight tube portion having an annular passage directed substantially axially at its outlet end, and a diffuser passage opening from the side of said annular passage above its outlet end in a non-radial direction and adapted to divert portions of the flow therefrom.

33. An elbow draft tube comprising a primal tube member to receive the water from a turbine, and an angular member, the primal member being diverged and decreasing in length towards its discharge extremity in the downstream direction of the angular member.

34. An elbow draft tube comprising a primal member and an elbow member at an angle thereto, the primal member being diverged at its outlet extremity and gradually shortened in length from the upstream towards the downstream direction of the angular elbow member.

35. An elbow draft tube comprising a primal member to receive the water directly from a turbine, and an angular elbow member, the primal member having a diverged outlet extremity with an upward terminal slope, the outlet extremity of the primal member being freely open to the angular elbow member.

36. A water-receiving draft tube member having a discharge extremity with a forward upwardly inclined terminal.

37. A water-receiving draft tube member of an elbow draft tube regularly diverging its full length to the outlet extremity thereof and decreasing in length from a maximum to a minimum extent at the forward downstream portion of the discharge extremity to accelerate the discharge of the water from the member.

38. A water-receiving tubular member of an elbow draft tube gradually diverging fully at its outlet extremity and decreasing in length in advance of the longitudinal axis and at the downstream side portion of the member, and means at an angle to the said member and into which the latter discharges.

39. In an elbow draft tube, a primal member for receiving water from a turbine gradually increasing in diameter towards its outlet extremity, the outlet extremity being inclined to gradually reduce the length of the member towards one side of the longitudinal axis at the downstream side portion of the member, and means into which the member discharges.

40. An elbow draft tube comprising a primal member gradually increasing in diameter fully to its discharge extremity to receive water from a turbine, the discharge extremity of said member being also disposed at an angle of inclination, and an angular elbow member into which the primal member discharges, the incline of the discharge extremity of the primal member being from a lowermost point at the up-stream portion of the angular elbow member upwardly to the highest point in the direction of the downstream portion of the said angular member.

41. In an elbow draft tube, a primal water-receiving tubular member having a discharge extremity which is inclined and enlarged, and an angular elbow member with which the discharge extremity of the primal member has communication, the angular elbow member having a divergence relatively to the discharge extremity of the said primal member.

42. An elbow draft tube comprising angularly intersecting members, the one member having an enlarged upwardy sloping forward portion opening into the other member.

43. An elbow draft tube consisting of a vertically disposed primal member to receive water from a turbine, the said member gradually diverging downwardly and having an upwardly sloped bottom, and an elbow member at an angle to the said vertical member, the vertical member having its greatest dependence at the upstream portion of the said angular elbow member.

44. An elbow draft tube consisting of a vertically disposed primal member to receive water from a turbine, the said member gradually diverging downwardly and having an upwardly sloped bottom, and an elbow member at an angle to the said vertical member, the vertical member having its greatest dependence at the upstream portion of the said angular elbow member and located at a distance from the upstream end wall of the said angular elbow member.

45. The combination with a turbine having water operated means, of an elbow draft tube comprising a primal tube member diverging from the turbine, and having its discharge extremity sloped at an upward angle of inclination from a maximum to a minimum extending portion thereof, and an angular elbow member with which the enlarged sloped discharge extremity of the primal member has communication.

46. An elbow draft tube comprising a primal member to receive the water directly from a turbine and an angular elbow member, the primal member having a diverged outlet extremity, with an upward terminal slope, the outlet extremity having a curved flared construction merging into the angular elbow member.

47. An elbow draft tube comprising a primal member to receive water directly from a turbine and an angular elbow member, the primal member having a diverged outlet extremity with an upward terminal slope, and the angular elbow member also diverging in a downstream direction.

48. In apparatus for converting velocity head of flow into pressure head, the combination with a conduit receiving the flow, of means on one side of said conduit adapted to divert successive portions of said main flow so as to gradually and continuously reduce the quantity of the flow remaining in successive portions of said conduit thereby decelerating the velocity of the remaining flow.

49. In apparatus for converting velocity head of flow into pressure head, the combination with a conduit receiving the flow, of an opening on one side of said conduit adapted to divert successive portions of said main flow so as to gradually and continuously reduce the quantity of the main flow remaining in successive portions of said conduit thereby decelerating the velocity of the remaining flow.

50. In apparatus for converting velocity head of flow into pressure head, the combination with a conduit receiving the flow, of an opening of less width than the diameter of the conduit on the down-stream side of said conduit adapted to divert successive portions of said main flow so as to gradually and continuously reduce the quantity of the main flow remaining in successive portions of said conduit thereby decelerating the velocity of the remaining flow.

51. A draft tube comprising an inlet and outlet, said outlet having two guiding piers therein so disposed as to cause the fluid in the center portion to have a different rate of change in its velocity from that in the side portions.

52. A draft tube having an inlet and outlet, said outlet having at least two guiding piers each spaced from the sides of said outlet and lying in planes which are angularly disposed relative to each other.

53. A draft tube comprising an inlet and outlet, said outlet having roof portions which are substantially straight in transverse section and a plurality of guiding piers in said outlet so disposed as to provide a central passage and side passages and also to effect a more rapid rate of deceleration in said side passages than in the center passages.

HARVEY BIRCHARD TAYLOR.